(12) United States Patent
Kaneyasu et al.

(10) Patent No.: US 7,321,841 B2
(45) Date of Patent: Jan. 22, 2008

(54) THREE-DIMENSIONAL SHAPE MEASURING METHOD AND MEASURING APPARATUS THEREOF

(75) Inventors: Kensaku Kaneyasu, Utsunomiya (JP); Eisaku Hasegawa, Tochigi-ken (JP); Toshiyuki Kondo, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/562,969

(22) PCT Filed: Jun. 24, 2004

(86) PCT No.: PCT/JP2004/008890

§ 371 (c)(1),
(2), (4) Date: Dec. 29, 2005

(87) PCT Pub. No.: WO2005/001375

PCT Pub. Date: Jan. 6, 2005

(65) Prior Publication Data

US 2006/0161382 A1   Jul. 20, 2006

(30) Foreign Application Priority Data

Jun. 30, 2003 (JP) ............................. 2003-187247

(51) Int. Cl.
*G06F 15/00* (2006.01)
(52) U.S. Cl. ...................... 702/167; 702/168
(58) Field of Classification Search ............... 702/127, 702/167, 168, 170, 150, 155, 158; 700/159, 700/160, 161; 33/503, 554
See application file for complete search history.

(56) References Cited

U.S. PATENT DOCUMENTS

| 4,799,170 | A | 1/1989 | Nakaya et al. |
| 6,611,786 | B1* | 8/2003 | Zhang et al. ............... 702/156 |
| 6,651,029 | B2* | 11/2003 | Sakai ......................... 702/167 |

FOREIGN PATENT DOCUMENTS

| CN | 86 1 01800 | 9/1986 |
| JP | 61-98406 | 5/1986 |
| JP | 6-274221 | 9/1994 |
| JP | 8-338717 | 12/1996 |
| JP | 2003-505682 | 2/2003 |

* cited by examiner

*Primary Examiner*—Bryan Bui
(74) *Attorney, Agent, or Firm*—Kratz, Quintos & Hanson, LLP

(57) ABSTRACT

A three-dimensional shape measuring method and a measuring apparatus thereof that allow the operation of a robot to be readily taught and set in a short time when a three-dimensional measuring device mounted on the robot is caused to move along the surface of a work, thereby measuring the shape of the work. A block data representative of measurement operation that causes the three-dimensional measuring device, which is a laser scanner, to move along the surface of the work is set and recorded. Then longitudinally copying (Step S2) and laterally copying (Step S3) block data is longitudinally and laterally copied after entering the size and basic shape type of the work. Then the shape of the work is measured on the basis of the copied block data.

13 Claims, 16 Drawing Sheets

THREE-DIMENSIONAL SHAPE MEASURING METHOD AND MEASURING APPARATUS THEREOF

BACKGROUND OF THE INVENTION

1. Field of the Invention

The present invention relates to a method of and an apparatus for measuring a three-dimensional shape, and more particularly to a method of and an apparatus for measuring a three-dimensional shape by causing a three-dimensional measuring unit mounted on a robot to trace the surface of a workpiece to measure the surface shape of the workpiece.

2. Description of the Related

Three-dimensional measuring units can measure the position and shape of a workpiece by tracing the surface of the workpiece. Heretofore, it has been customary either for the person who is to measure the workpiece to carry a three-dimensional measuring unit and trace the surface of the workpiece with the three-dimensional measuring unit, or to install a three-dimensional measuring unit on a dedicated gatepost-shaped coordinate measuring device for measurement. If the person directly holds the three-dimensional measuring unit for measurement, then it is burdensome for the person when it takes a long time to measure the workpiece. Further, the gatepost-shaped coordinate measuring device is of a complex structure and is expensive.

In view of the above, efforts have recently been made to install a three-dimensional measuring unit on the arm of a robot and to operate the three-dimensional measuring unit to measure the surface shape of a workpiece.

There has been proposed a similar technology for recognizing reference points set in an external space or a workpiece with a position measuring unit and measuring the shape of a recognized measurement area with a laser scanner (see, e.g., Japanese Laid-Open Patent Publication No. 2003-505682 (WO01/007866)).

If a robot is used to measure the surface shape of a workpiece, then it is necessary to train the robot for measuring operation, and to establish reference teach points. Though it is a simple task to establish teach points, it takes a significant amount of time because the number of teach points involved is large. Particularly, when workpieces to be measured are provided in various types, it is necessary for the operator to retrain the robot for each workpiece type, and hence is burdensome for the operator.

SUMMARY OF THE INVENTION

It is an object of the present invention to provide a method of and an apparatus for measuring a three-dimensional shape, which make it possible to train a robot for operation simply within a short period of time for causing a three-dimensional measuring unit mounted on the robot to trace the surface of a workpiece to measure the surface shape of the workpiece.

According to the present invention, there is provided a method of measuring a three-dimensional surface shape of a workpiece by moving a three-dimensional measuring unit mounted on a robot to trace a surface of the workpiece, comprising a first step of setting and recording block data representing a measuring operation to cause the three-dimensional measuring unit to trace a predetermined area, a second step of setting a length and/or a height of the workpiece, a third step of selecting one of a plurality of basic shape types which is similar to a shape of the workpiece, a fourth step of duplicating the block data such that a hypothetical block representing the block data covers an area to be measured of the surface of the workpiece which is projected onto a hypothetical space, depending on the selected basic shape type and the length and/or the height of the workpiece, and a fifth step of measuring the surface shape of the workpiece based on the duplicated block data.

By thus measuring the surface shape of the workpiece based on the duplicated block data, the robot can be trained for operation simply within a short period of time.

The three-dimensional measuring unit may include a displacement gage for measuring the distance up to the workpiece, and the robot may be operated based on the distance measured by the displacement gage to move the three-dimensional measuring unit toward or away from the workpiece to keep the three-dimensional measuring unit in a measurable range from the workpiece while the measuring operation is performed.

If the block data comprises data representing a motion pattern for reciprocally moving the three-dimensional measuring unit in strokes spaced by a detection width, then the block data can be generated efficiently and the surface shape of the workpiece can be measured efficiently.

In the duplicating step, the block data may be deformed and duplicated to make the method highly flexible with respect to workpieces available in a variety of types.

In the measuring step, after the surface shape is measured based on predetermined block data and when the surface shape is measured based on next block data, a base of the robot may be moved in positional alignment with the next block data to allow the block data to be duplicated without the need for changing parameters. Therefore, the process of duplicating the block data is easily performed.

If the base is placed on a movable carriage to move together with the movable carriage, then the base can be moved accurately and easily.

According to the present invention, there is also provided a method of measuring a three-dimensional surface shape of a workpiece by moving a three-dimensional measuring unit mounted on a robot to trace a surface of the workpiece, comprising a step of setting a basic path for moving the three-dimensional measuring unit a predetermined distance, and a step of duplicating the basic path a plurality of times at predetermined intervals to set block data representing a measuring operation to cause the three-dimensional measuring unit to trace the surface of the workpiece.

Because the block data can be set by duplicating one basic path, the process of setting the block data is easily performed.

According to the present invention, there is further provided an apparatus for measuring a three-dimensional surface shape of a workpiece by moving a three-dimensional measuring unit mounted on a robot to trace a surface of the workpiece, comprising a block data setting recorder for setting and recording block data representing a measuring operation to cause the three-dimensional measuring unit to trace a predetermined area, a data input unit for setting a length and/or a height of the workpiece, a basic shape selector for selecting one of a plurality of basic shape types which is similar to a shape of the workpiece, a block data duplicator for duplicating the block data such that a hypothetical block representing the block data covers an area to be measured of the surface of the workpiece which is projected onto a hypothetical space, depending on the selected basic shape type and the length and/or the height of the workpiece, and a measurement performing unit for measuring the surface shape of the workpiece based on the duplicated block data.

By thus measuring the surface shape of the workpiece based on the duplicated block data, the robot can be trained for operation simply within a short period of time.

DETAILED OF AN EXEMPLARY EMBODIMENT

A method of and an apparatus for measuring a three-dimensional shape according to an embodiment of the present invention will be described below with reference to FIGS. 1 through 16 of the accompanying drawings.

Figure 1:
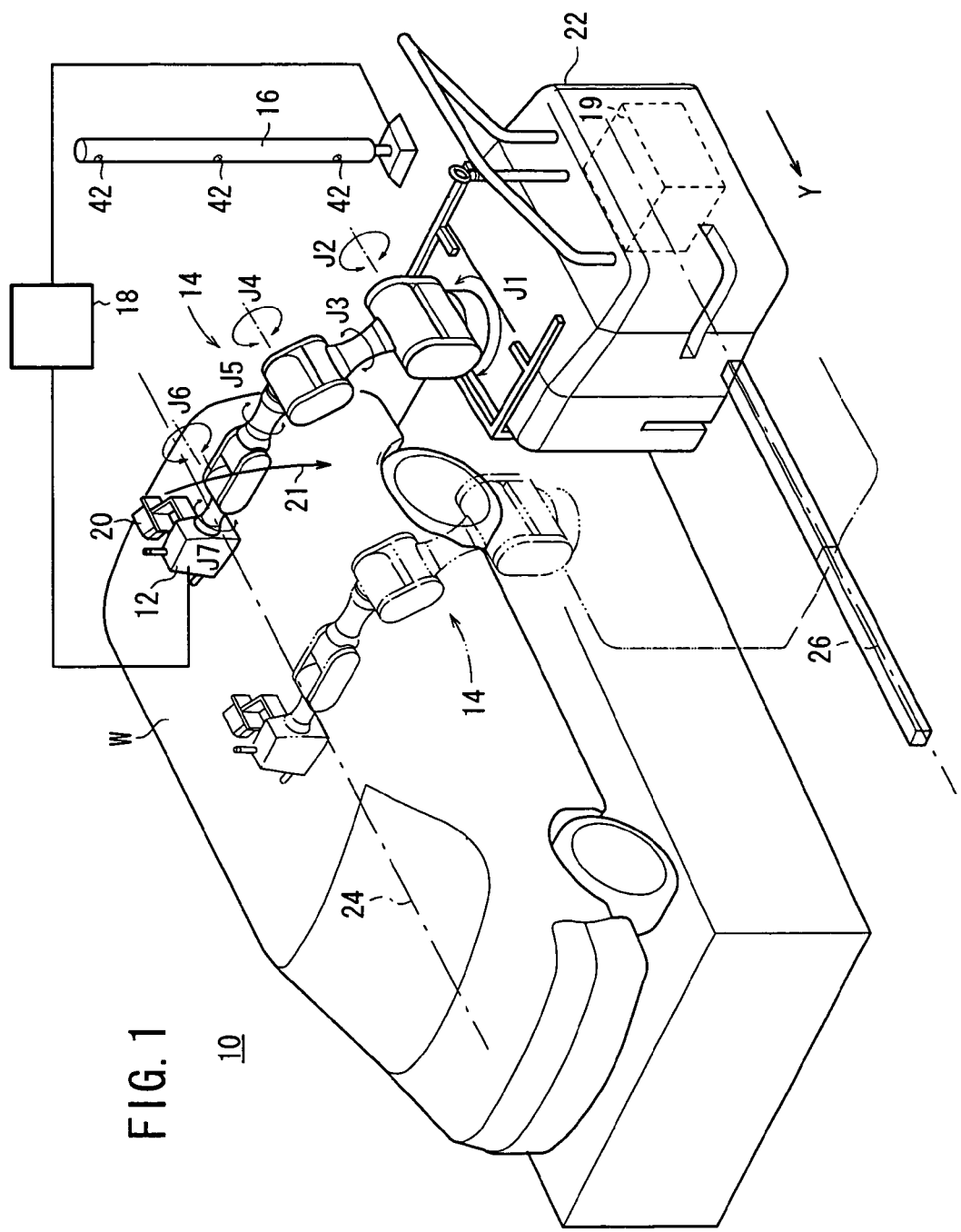
FIG. 1 is a schematic perspective view of a three-dimensional shape measuring apparatus according to an embodiment of the present invention.

As shown in FIG. 1, a three-dimensional shape measuring apparatus 10, to which a three-dimensional shape measuring method according to the present embodiment is applied, is a system for measuring the three-dimensional shape of a workpiece W shaped as a vehicle. The three-dimensional shape measuring apparatus 10 has an articulated robot 14 having, as an end effector, a laser scanner (three-dimensional measuring unit) 12 for measuring the surface shape of the workpiece W, a position detecting device 16 for detecting the position of the laser scanner 12, and a data processor 18 for processing data supplied from the articulated robot 14 and the position detecting device 16. The articulated robot 14 is placed on a movable carriage 22, which houses therein a controller 19 for controlling the articulated robot 14. The workpiece W is a clay model whose shape has not yet been converted into data, for example, and has not yet been recognized by the controller 19.

The articulated robot 14 has seven-axis joints and attitude redundancy. Specifically, the articulated robot 14 can take various attitudes (theoretically, an infinite number of attitudes) while keeping the position and attitude of the laser scanner 12. A laser displacement gage 20 for measuring the distance up to the workpiece W (see FIG. 3) is mounted on a distal end 36 of the articulated robot 14 by a support 20a.

The articulated robot 14 moves the laser scanner 12 along the surface of the workpiece W based on basic teaching data as indicated by the arrow 21. At this time, the articulated robot 14 moves the laser scanner 12 to keep the laser scanner 12 at a predetermined distance L+e spaced from the surface of the workpiece W by referring to the data of the laser displacement gage 20.

The movable carriage 22 with the articulated robot 14 placed thereon is self-propelled for movement along a rail 26 that extends parallel to a propeller shaft axis 24 of the workpiece W. Because the articulated robot 14 is movable, after a certain area of the workpiece W has been measured, the articulated robot 14 is moved to measure a next area of the workpiece W.

Figure 2:
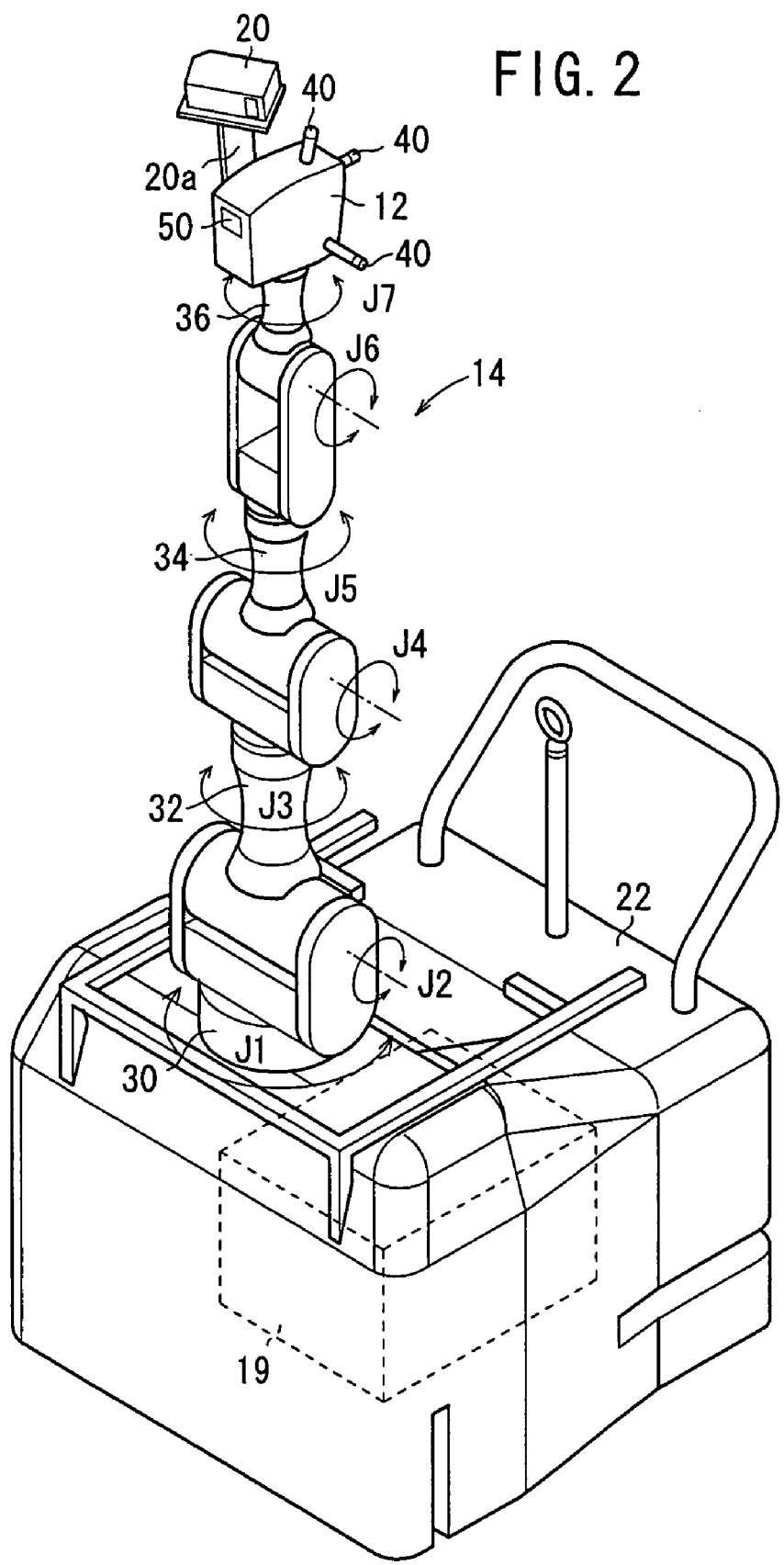
FIG. 2 is a perspective view of an articulated robot having a laser scanner and a movable carriage with the articulated robot placed thereon.

As shown in FIG. 2, the articulated robot 14 has a base 30 and a first arm 32 and a second arm 34 that are successively mounted on the base 30. The laser scanner 12 is mounted on the distal end 36 of the second arm 34. The first arm 32 is connected to the base 30 through axes J1, J2 for horizontal and vertical angular movement. The first arm 32 can be twisted about an axis J3 disposed therein.

The second arm 34 is angularly movably coupled to the first arm 32 through an axis J4. The second arm 34 can be twisted about an axis J5 disposed therein.

The distal end 36 is angularly movably coupled to the second arm 34 through an axis J6, and can be twisted about an axis J7 disposed therein.

Because the articulated robot 14 has the seven-axis joints, the articulated robot 14 has attitude redundancy as described above so as to be freely movable as with a human arm.

All of the axes J1 through J7 of the articulated robot 14 may not necessarily be angularly movable. Rather, the articulated robot 14 may have movable units for expansion and contraction, parallel link motion, or the like insofar as it is structured for attitude redundancy. The number of joints may be eight or more.

Figure 3:
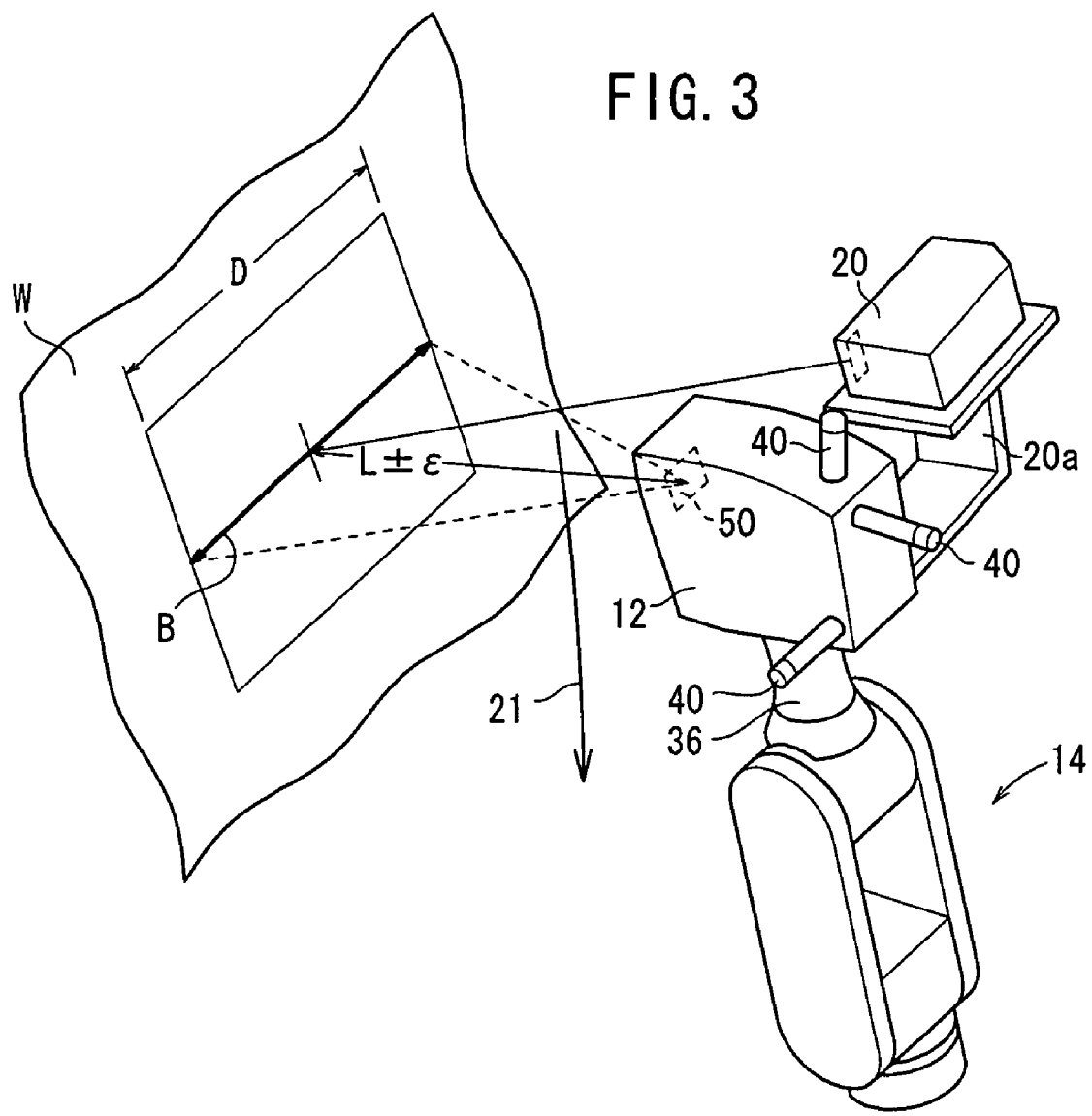
FIG. 3 is a schematic perspective view showing the manner in which the surface shape of a workpiece is measured using the laser scanner and a laser displacement gage.

As shown in FIG. 3, the laser scanner 12 has infrared LEDs (Light Emitting Diodes) 40 disposed respectively on three protrusions. The position detecting device 16 (see FIG. 1) detects infrared radiations emitted from the infrared LEDs 40 with three detectors 42, each including a one-dimensional CCD (Charge-Coupled Device), and accurately detects the position of the laser scanner 12 in a three-dimensional space. The position detecting device 16 may have two or more two-dimensional CCDs as the detectors 42.

Specifically, the position detecting device 16 detects respective energies from the three infrared LEDs 40 with the detectors 42 and recognizes the directions of the infrared LEDs 40 from the detectors 42 for thereby determining the spatial position and attitude of the laser scanner 12. The position detecting device 16 performs this process in real time.

The laser scanner 12 can measure the surface shape of the workpiece W in a zone having a detection width D by applying a laser beam from a laser beam emitter 50 while scanning the zone in the direction indicated by the arrow B. The laser scanner 12 has a measurable range. The distance from the surface of the workpiece W to the laser beam emitter 50 needs to be set in the range of L±ϵ, and is measured by the laser displacement gage 20. The data measured by the laser displacement gage 20 is supplied to and processed by the controller 19, which controls the attitude of the articulated robot 14 to hold the laser scanner 12 in an appropriate position.

Figure 4:
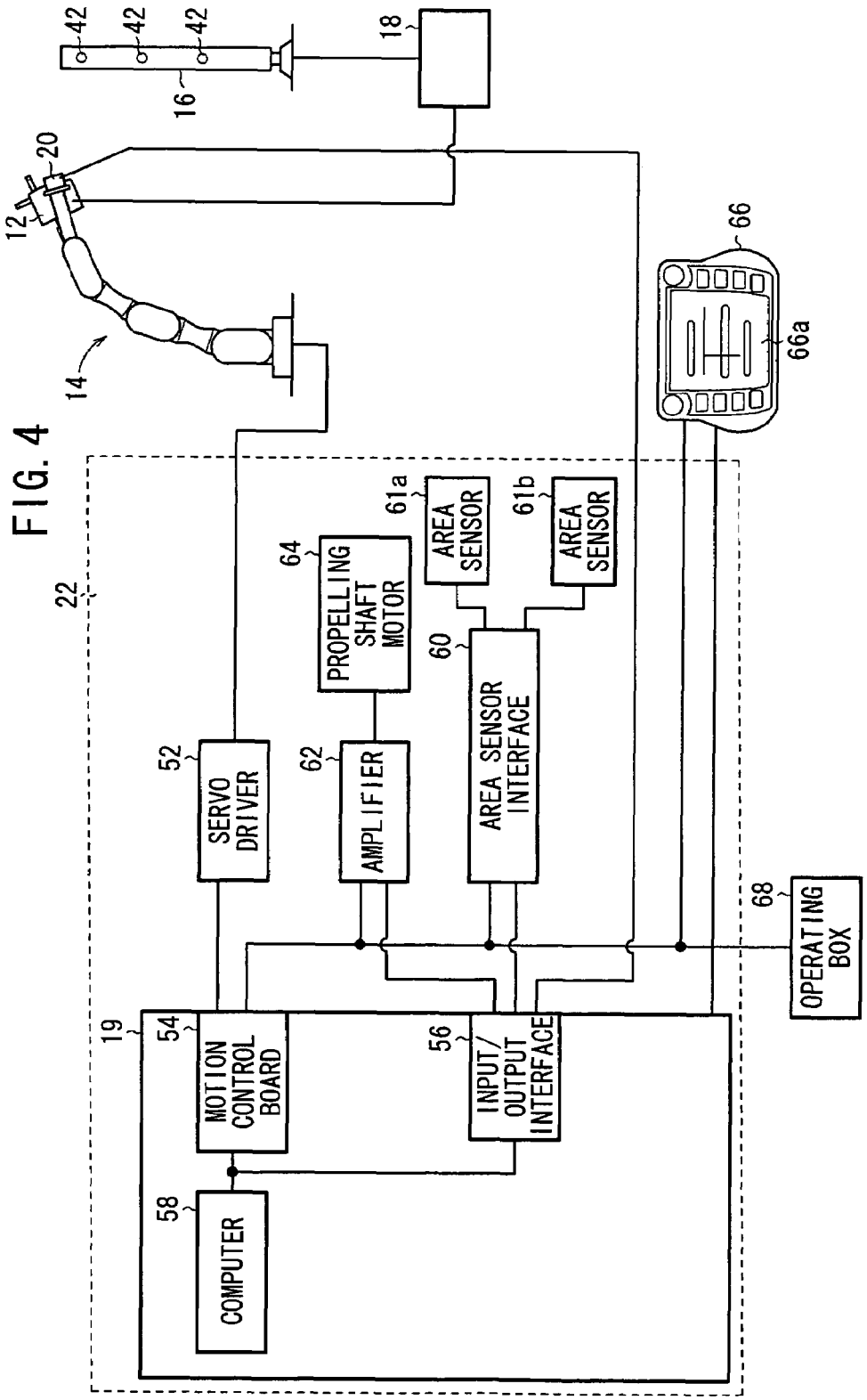
FIG. 4 is a schematic block diagram of the three-dimensional shape measuring apparatus according to the embodiment of the present invention.

As shown in FIG. 4, the controller 19 has a motion control board 54 for moving the articulated robot 14 through a servo driver 52, an input/output interface 56, and a computer 58. The computer 58 is connected to the motion control board 54 and the input/output interface 56, and controls the controller 19 in its entirety. The computer 58 includes a CPU which serves as a main processing unit that operates by loading a program from a predetermined program recording medium, and a ROM as the predetermined program recording medium, a RAM, etc.

The movable carriage 22 has two area sensors 61a, 61b as safety units for monitoring the periphery thereof. The controller 19 is connected to an area sensor interface 60 as an interface with the area sensors 61a, 61b, and is capable of detecting whether there is an obstacle or not. The controller 19 is also capable of operating a propelling shaft motor 64 by an amplifier 62 for self-propelling the movable carriage 22. The controller 19 is connected to a teaching box (data input unit) 66 for setting block data 120 (see FIG. 8) serving as basic teaching data, and also to an operating box 68. The controller 19, the teaching box 66, and the operating box 68 can perform data communication with each other. The teaching box 66 has a monitor screen 66a as a display means.

If the movable carriage 22 has an uninterruptible power source and the controller 19 or the like is energized through the uninterruptible power source, then the operation reliability is increased.

Figure 5:
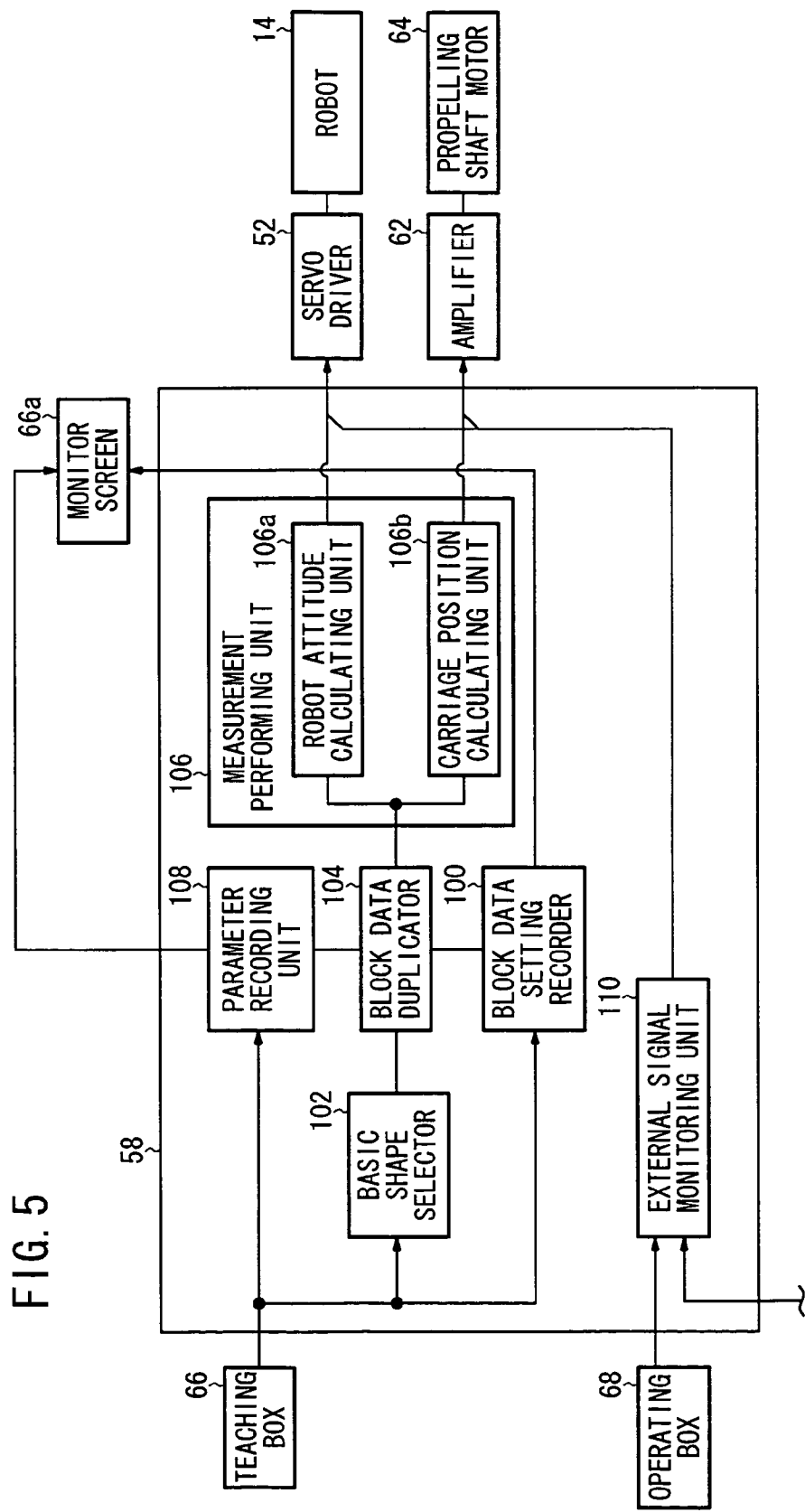
FIG. 5 is a schematic block diagram of an internal processing system of a computer.

As shown in FIG. 5, the computer 58 has a block data setting recorder 100 for setting block data 120 (see FIG. 8) representative of measuring operation to cause the laser scanner 12 to trace a predetermined area and recording the set block data 120, a basic shape selector 102 for selecting one of basic shape types which is similar to the shape of the workpiece W, a block data duplicator 104 for duplicating the block data 120 such that a hypothetical block representing the block data 120 covers an area to be measured of the surface of the workpiece W that is projected onto a hypothetical space, depending on a selected basic shape type and the length U (see FIG. 14) and the height h of the workpiece W, and a measurement performing unit 106 for operating the articulated robot 14 and the propelling shaft motor 64 based on the duplicated block data 120. The measurement performing unit 106 has a robot attitude calculating unit 106a for operating the articulated robot 14 and a carriage position calculating unit 106b for operating the propelling shaft motor 64.

The computer 58 has an external signal monitoring unit 110 for manually operating or stopping, in an emergency, the articulated robot 14 and the propelling shaft motor 64 based on a switch signal supplied from the operating box 68 or the like.

The length U (see FIG. 14) and the height h of the workpiece W are entered using the teaching box 66 and stored in a parameter recording unit 108. The data stored in the parameter recording unit 108 and the block data 120 set by the block data setting recorder 100 can be displayed on the monitor screen 66a.

FIG. 5 schematically shows in simplified block form the relationship between the internal processing system of the computer 58 and external devices for a better understanding with the input/output interface 56 (see FIG. 4), etc. being omitted from illustration.

Figure 6:
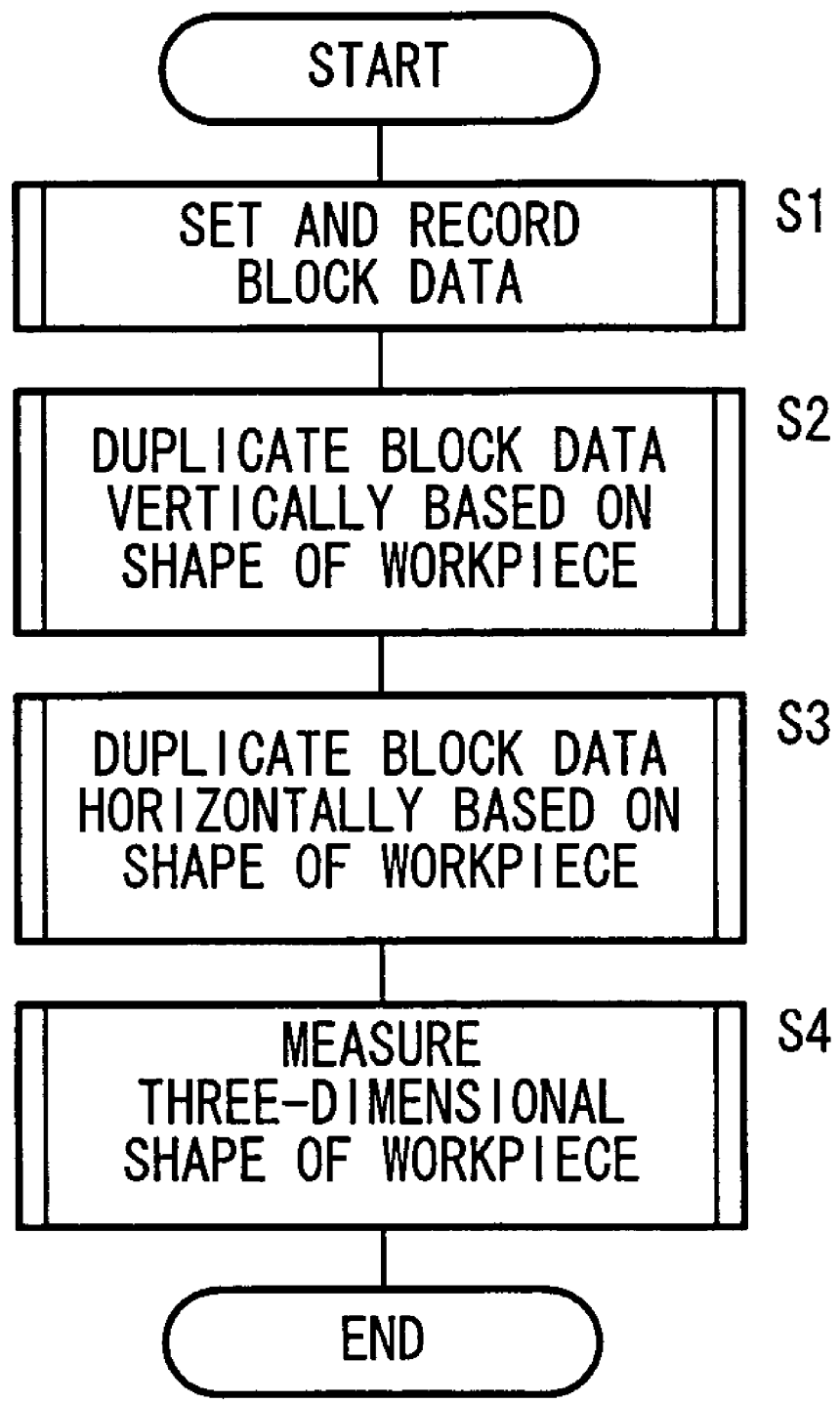
FIG. 6 is a flowchart of the sequence of a three-dimensional shape measuring method according to an embodiment of the present invention.

Next, a method of measuring the surface shape of the workpiece W with the three-dimensional shape measuring apparatus 10 thus arranged by causing the laser scanner 12 mounted on the articulated robot 14 to trace the surface of the workpiece W will be described below with reference to FIG. 6. According to the sequence shown in FIG. 6, an inputting process using the teaching box 66 (see FIG. 4) and the operating box 68 and a confirming process using the monitor screen 66a are performed by the operator, and other processes are basically performed by programmed operation of the computer 58. In the description which follows, the direction of the propeller shaft axis is referred to as a Y direction (see FIG. 14), the vertical direction of the workpiece W as a Z direction (see FIG. 14), and the direction perpendicular to the Y and Z directions (the direction perpendicular to the sheet of FIG. 14) as a X direction.

Figure 8:
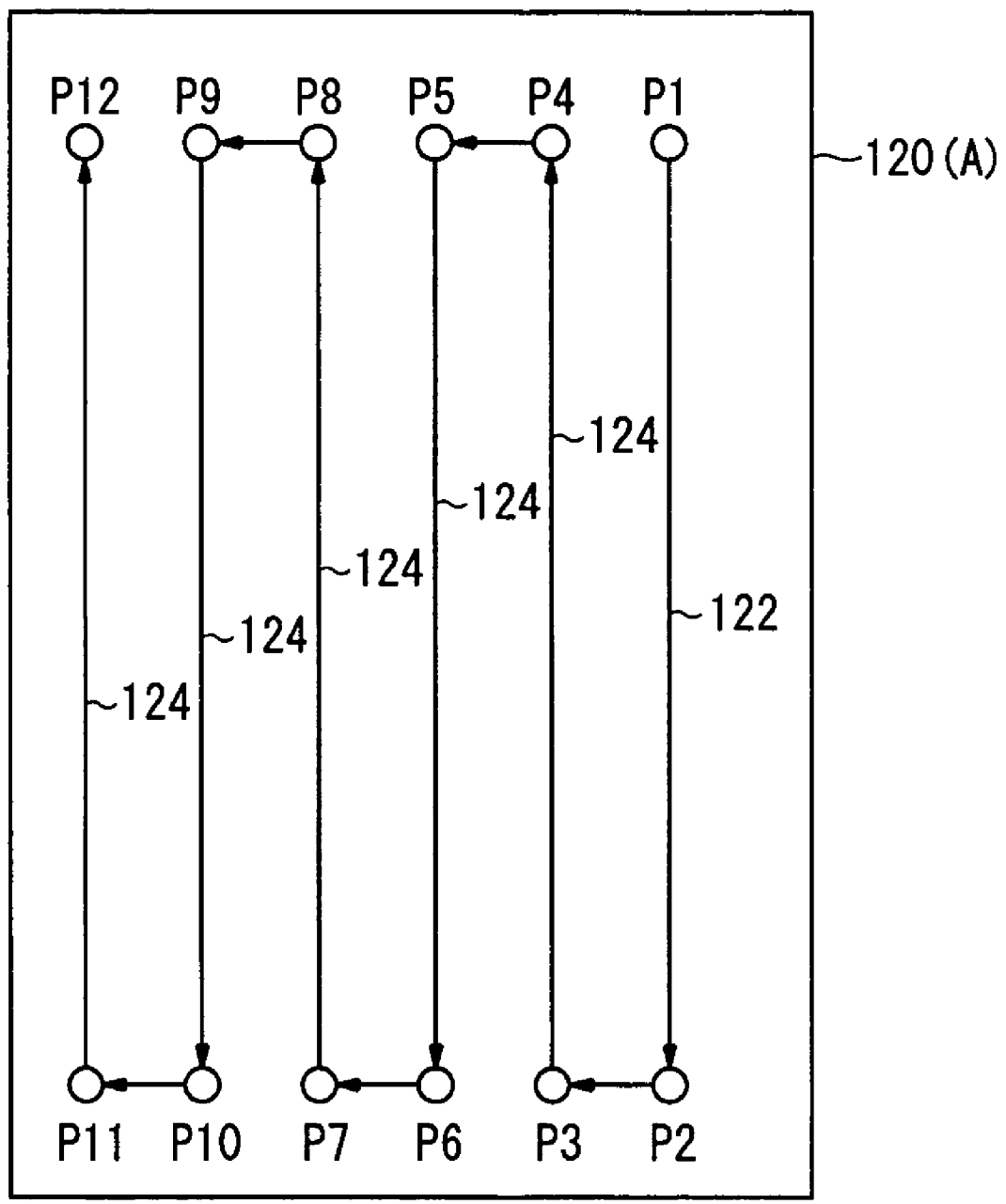
FIG. 8 is a diagram showing block data.

In step S1, which is a preparatory process, the block data setting recorder 100 (see FIG. 5) mainly operates to set and record the block data 120 (see FIG. 8). Basically, once step S1 is executed, it may subsequently be omitted.

Then, mainly the block data duplicator 104 operates to duplicate the block data 120 based on the basic shape type of the workpiece W.

Specifically, in step S2, the block data 120 is duplicated in the Z direction that is the vertical direction based on the shape of the workpiece W.

Then, in step S3, the block data 120 is duplicated in the Y direction that is the horizontal direction based on the shape of the workpiece W.

The processing of steps S2, S3 may be dispensed with for workpieces W having similar shapes. The processing of steps S2, S3 is basically performed by programmed operation of the computer 58 to duplicate the block data 120 such that the workpiece W is covered with the block data 120 in a hypothetical space. To allow the operator to judge whether or not the processing is performed properly with ease, the workpiece W and the block data 120 in a hypothetical space may be displayed in a graphic pattern on the monitor screen 66a during the processing.

In step S4, mainly the measurement performing unit 106 operates the articulated robot 14 and the propelling shaft motor 64 to measure the three-dimensional shape of the workpiece W.

The processing of step S1, i.e., the process for setting and recording the block data 120, will be described below with reference to FIGS. 7 and 8.

Tool coordinates of the laser scanner 12 will be indicated as Pa(X, Y, Z, ϕ, θ, ψ) or Qa(X, Y, Z, ϕ, θ, ψ). The parameters X, Y, Z represent absolute values respectively in the X, Y, and Z directions, and the parameters ϕ, θ, ψ represent attitude values in rolling, pitching, and yawing directions. The suffix "a" represents a natural number indicative of the operating order, teaching order, or the like. For the sake of convenience, Pa(X, Y, Z, ϕ, θ, ψ) will also be referred to as Pa and Qa(X, Y, Z, ϕ, θ, ψ) as Qa.

As shown in FIG. 8, the block data 120 includes data made up of a basic path 122 that is set by moving the laser scanner 12 (see FIG. 3) a certain distance in one direction and duplicated paths 124 that are produced by duplicating the basic path 122 in a direction perpendicular thereto n times, the number which is entered and set. The block data 120 represents a measuring operation for causing the laser scanner 12 to trace the workpiece W. The basic path 122 and the duplicated paths 124 correspond to the arrow 21 (see FIG. 1).

For example, the block data 120 shown in FIG. 8 is produced when the duplicated paths 124 are set by duplicating the basic path 122 five times (n=5). An interval p (see FIG. 10) between the basic path 122 and the duplicated paths 124 is a value that is entered and set, and is set to the same value as the detection width D (see FIG. 3) of the laser scanner 12. The number n and the interval p are entered using the teaching box 66.

The block data 120 is represented by tool coordinates P1, P2, ... Pe (see FIG. 10) of the laser scanner 12 at the starting and ending points of the basic path 122 and the duplicated paths 124. The suffix "e" is a number representing the final place and is expressed as e=2(n−1)+4. For example, when n=5, e=12.

Figure 7:
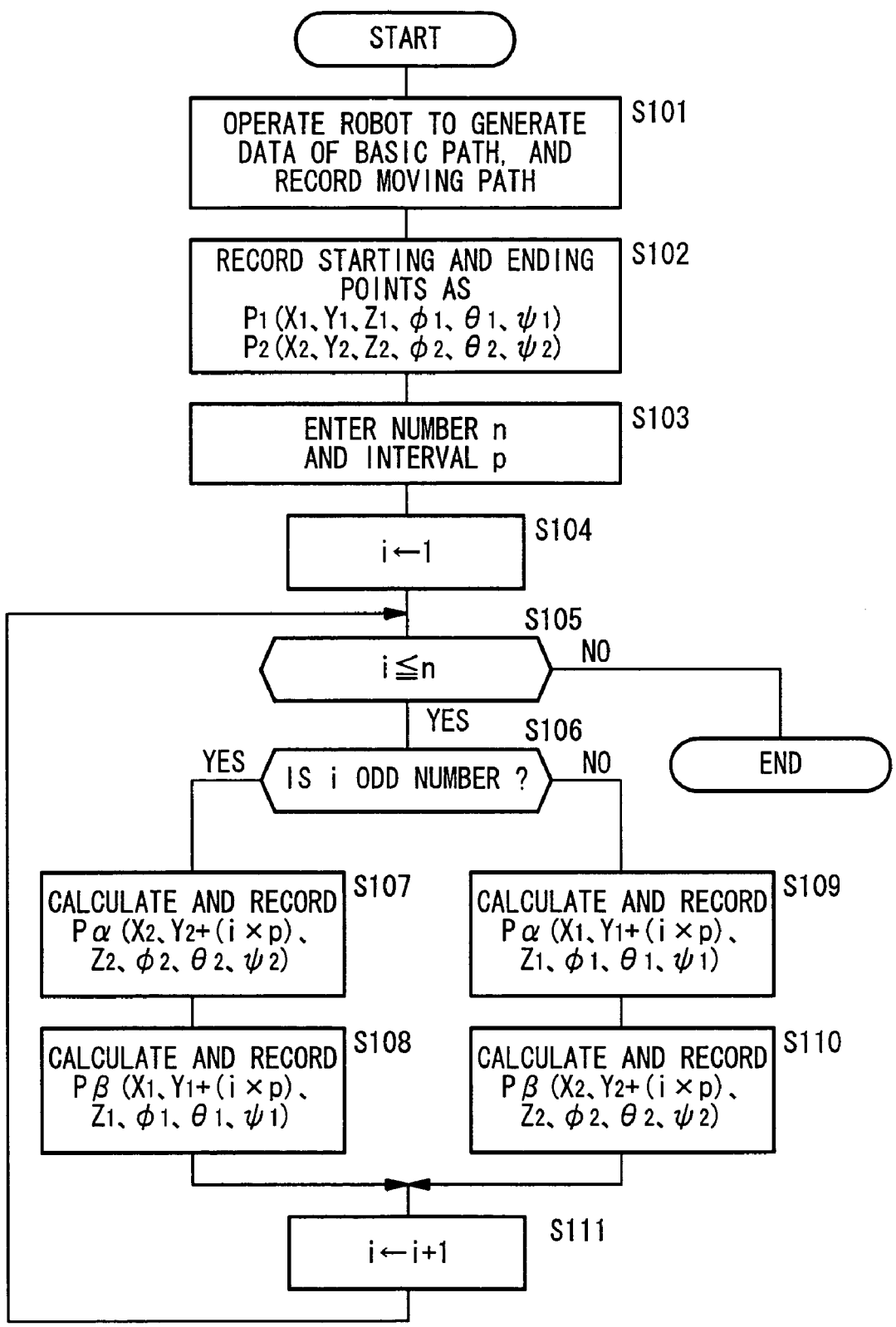
FIG. 7 is a flowchart of the sequence of a process of setting and recording block data.

In step S101 shown in FIG. 7, in order to generate data of the basic path 122 in the Z direction which serves as a basis for the block data 120, the articulated robot 14 is operated using the teaching box 66 to move the laser scanner 12 a suitable distance in the Z direction, and the traveled path thereof is recorded.

In step S102, the attitudes of the laser scanner 12 at the starting and ending points of the recorded traveled path are recorded as $P1(X_1, Y_1, Z_1, \phi_1, \theta_1, \psi_1)$ and $P2(X_2, Y_2, Z_2, \phi_2, \theta_2, \psi_2)$.

In step S103, the number n and the interval p are entered using the teaching box 66.

In step S104, a counter i is initialized to "1".

In step S105, the counter i and the number n are compared with each other. If i>n, then since all the tool coordinates P1, P2, ... Pe indicative of the block data 120 have been determined, the processing sequence is finished, and control goes to step S2 (see FIG. 6). If i≦n, then control goes to next step S106.

In step S106, it is confirmed whether the counter i represents an odd number or an even number. If the counter i represents an odd number, then control goes to step S107. If the counter i represents an even number, then control goes to step S109.

In step S107 (if i represents an odd number), then Pα representing the starting point of the ith duplicated path 124 is calculated. The suffix "α" is expressed as α=2(i−1)+3. Since Pα is represented as data produced by moving P2 a distance (i×p) in the Y direction, it is calculated as $P\alpha(X_2, Y_2+(i\times p), Z_2, \phi_2, \theta_2, \psi_2)$. The determined Pα is recorded.

In step S108, Pβ representing the ending point of the ith duplicated path 124 is calculated. The suffix "β" is expressed as β=α+1=2(i−1)+4. Since Pα is represented as data produced by moving P1 the distance (i×p) in the Y direction, it is calculated as $P\beta(X_1, Y_1+(i\times p), Z_1, \phi_1, \theta_1, \psi_1)$. The determined Pβ is recorded.

In step S109 (if i represents an even number), then Pα representing the starting point of the ith duplicated path 124 is calculated. Since Pα is represented as data produced by moving P1 the distance (i×p) in the Y direction, it is calculated as $P\alpha(X_1, Y_1+(i\times p), Z_1, \phi_1, \theta_1, \psi_1)$. The determined Pα is recorded.

In step S110, Pβ representing the ending point of the ith duplicated path 124 is calculated. Since Pβ is represented as data produced by moving P2 the distance (i×p) in the Y direction, it is calculated as $P\beta(X_2, Y_2+(i\times p), Z_2, \phi_2, \theta_2, \psi_2)$. The determined Pβ is recorded.

After step S108 or S110, the counter i is updated by "+1" in step S111. Then, control goes back to step S105.

In this manner, the tool coordinates P1, P2, ... Pe representative of the block data 120 can be calculated while the counter i is being updated. The calculated block data 120 is recorded by the block data setting recorder 100.

The block data 120 represents a motion pattern for reciprocally moving the laser scanner 12 while displacing the laser scanner 12 horizontally by the detection width D. The block data 120 can efficiently be generated and the surface shape of the workpiece W can efficiently be measured.

The block data 120 can be set by duplicating one basic path 122. Therefore, the process of setting the block data 120 is easily performed.

Actually, data representing the basic path 122 may only be the starting point P1 and the ending point P2, and a path indicating a line between these points may not necessarily be recorded. The starting point P1 and the ending point P2 can be expressed by six parameters indicative of the position and attitude of the laser scanner 12, as described above, and the angles of the axes J1 through J7 of the articulated robot 14 does not need to be recorded. This holds true for the duplicated paths 124.

Figure 9:
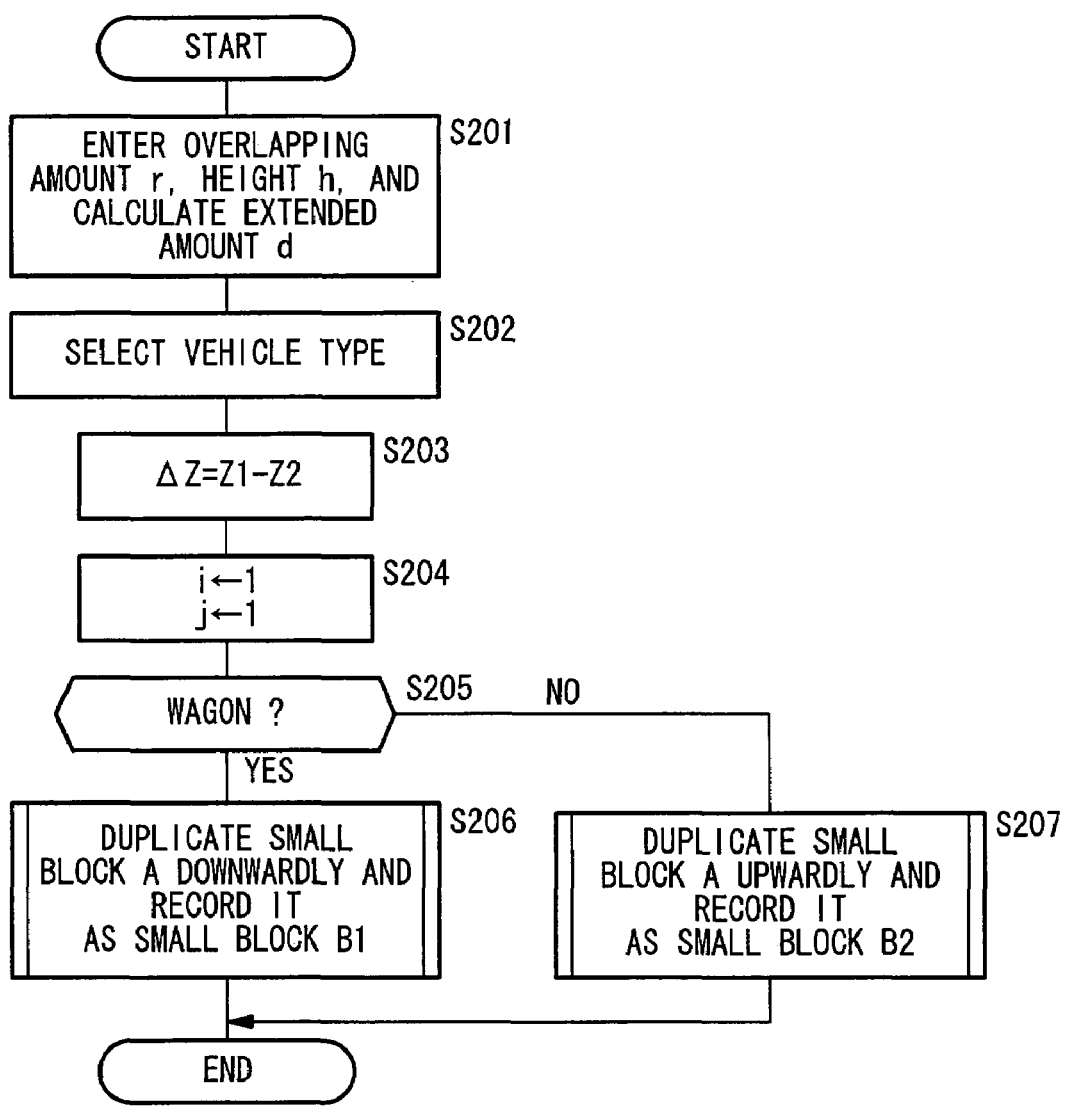
FIG. 9 is a flowchart of the sequence of a process of vertically copying block data based the shape of a workpiece.

The processing of step S2 executed after step S1 (see FIG. 6), i.e., the process for duplicating the block data 120 vertically (in the Z direction), will be described below with reference to FIGS. 9 and 10.

In step S2, the block data 120 is duplicated once downwardly for a vehicle type called a wagon (or a minivan or the like), and the block data 120 is duplicated once upwardly for a vehicle type called a sedan (or a coupe or the like). In the description which follows, the original block data 120 will be referred to as a small block A, the block data 120 duplicated downwardly for a wagon as a small block B1 (see FIGS. 10 and 14), and the block data 120 duplicated upwardly for a sedan as a small block B2 (see FIG. 15). The small blocks A, B1, B2 may be regarded as a hypothetical block representing the block data 120.

The shape of a wagon is characterized in that it is free of a trunk, has a large height, and a steeply slanted rear window. The shape of a sedan is characterized in that it has a small height and a gradually slanted rear window. By changing the pattern of duplicating the block data 120 depending on the vehicle types of different shapes, each of the shapes can appropriately measured.

Figure 10:
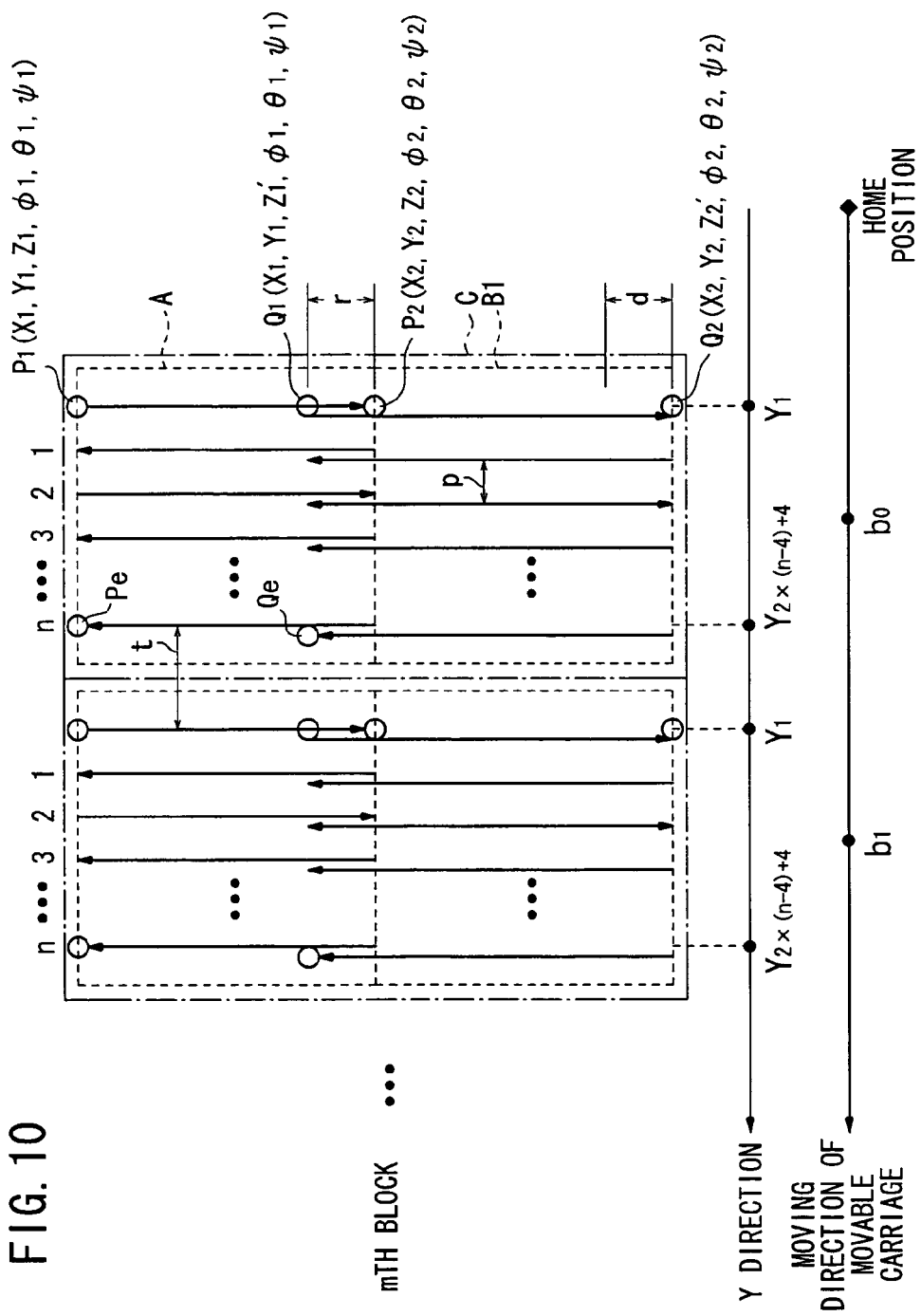
FIG. 10 is a diagram showing a large block made up of two small blocks.

As shown in FIG. 10, the small block A and the small block B1, and the small block A and the small block B2 are measured as well as their overlapping amount r to prevent a lack of measurement from occurring in the boundaries. In order to cover the height h of the workpiece W, the small blocks B1, B2 are duplicated so as to be deformed with respect to the small block A such that the small blocks B1, B2 are extended an extended amount d in the Z direction. The overlapping amount r and the height h are entered using the teaching box 66, and the extended amount d is calculated based on the height h.

In step S201, the overlapping amount r and the height h are entered using the teaching box 66. The extended amount d is calculated based on the height h, and recorded.

In step S202, the basic shape type of the workpiece W, i.e., the vehicle type, is selected. Vehicle types to choose from are recorded in the basic shape selector 102 (see FIG. 5), and the vehicle type is selected from the recorded vehicle types. Specifically, the vehicle type may be selected by operating the teaching box 66. In the present embodiment, the vehicle type is a wagon or a sedan. However, a vehicle type such as a truck may also be selected.

In step S203, the distance $\Delta Z$ in the Z direction between P1 and P2 of the block data 120 is determined. The distance $\Delta Z$ can be determined as $\Delta Z = Z1 - Z2$ where Z1, Z2 represent the values of Z-direction components among the parameters that make up P1, P2.

In step S204, counters i, j are initialized to "1".

In step S205, the processing is branched based on the vehicle type of the workpiece W. If the workpiece W is a wagon, then control goes to step S206 in which the small block A is duplicated downwardly to produce a small block B1. If the workpiece W is a sedan, then control goes to step S207 in which the small block A is duplicated upwardly to produce a small block B2.

Figure 11:
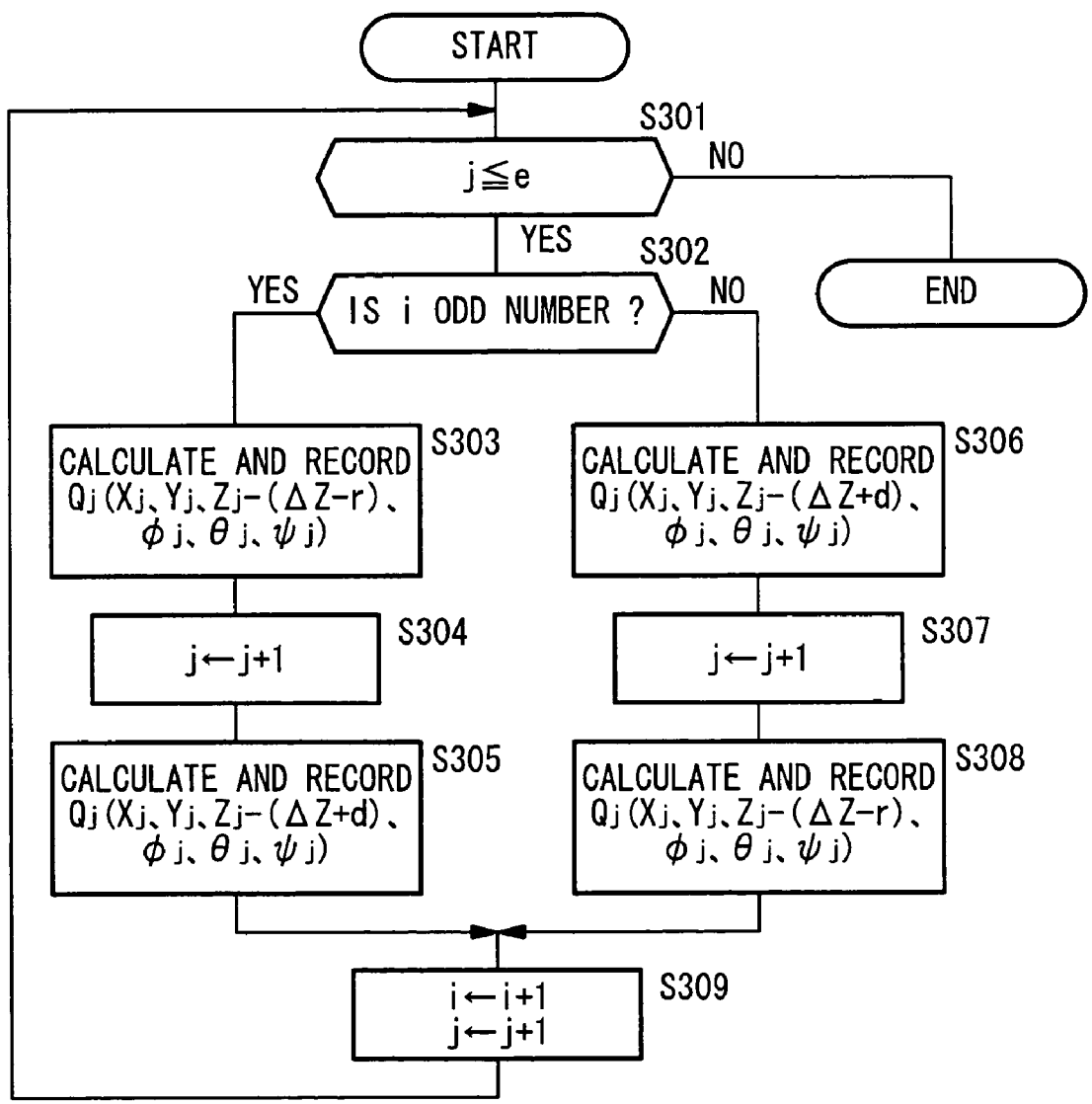
FIG. 11 is a flowchart of the sequence of a process of vertically copying block data based the shape of a workpiece if the workpiece is a wagon.

The processing of step S206, i.e., the processing to be performed if the workpiece W is a wagon, will be described below with reference to FIG. 11.

In step S301, the counter j and the parameter e are compared. As described above, the parameter e is expressed as $e = 2(n-1) + 4$. If j>e, then since all the tool coordinates Q1, Q2, . . . Qe indicative of the small block B1 have been determined, the processing sequence is finished, and control goes to step S3 (see FIG. 6). If j≦e, then control goes to the next step S302.

In step S302, it is confirmed whether the counter i represents an odd number or an even number. If the counter i represents an odd number, then control goes to step S303. If the counter i represents an even number, then control goes to step S306.

In step S303 (if i represents an odd number), then Qj representing the starting point of the ith one of (n+1) basic and duplicated paths 122, 124 that make up the small block B1 is calculated. Since Qj is represented as data produced by moving Pj, which represents the starting point of the ith one of (n+1) basic and duplicated paths 122, 124 that make up the small block A, a distance ($\Delta Z - r$) in a −Z direction, it is calculated as $Qj(X_j, Y_j, Z_j - (\Delta Z - r), \phi_j, \theta_j, \psi_j)$. The determined Qj is recorded. By thus determining Qj, the small block A and the small block B1 overlap each other by the overlapping amount r.

In step S304, the counter j is updated by "+1".

In step S305, Qj representing the ending point of the ith one of (n+1) basic and duplicated paths 122, 124 that make up the small block B1 is calculated. Since Qj is represented as data produced by moving Pj, which represents the ending point of the ith one of (n+1) basic and duplicated paths 122, 124 that make up the small block A, a distance ($\Delta Z + d$) in the −Z direction, it is calculated as $Qj(X_j, Y_j, Z_j - (\Delta Z + d), \phi_j, \theta_j, \psi j)$. The determined Qj is recorded. By thus determining Qj, the small block B1 is deformed so as to extend the extended amount d downwardly, and is set to cover the height h of the workpiece W.

In step S306 (if i represents an even number), then Qj representing the ending point of the ith one of (n+1) basic and duplicated paths 122, 124 that make up the small block B1 is calculated. Since Qj is represented as data produced by moving Pj, which represents the ending point of the ith one of (n+1) basic and duplicated paths 122, 124 that make up the small block A, the distance ($\Delta Z + d$) in the −Z direction, it is calculated as $Qj(X_j, Y_j, Z_j - (\Delta Z + d), \phi_j, \theta_j, \psi_j)$. The determined Qj is recorded.

In step S307, the counter j is updated by "+1".

In step S308, Qj representing the starting point of the ith one of (n+1) basic and duplicated paths 122, 124 that make up the small block B1 is calculated. Since Qj is represented as data produced by moving Pj, which represents the starting point of the ith one of (n+1) basic and duplicated paths 122, 124 that make up the small block A, the distance ($\Delta Z - r$) in the −Z direction, it is calculated as $Qj(X_j, Y_j, Z_j - (\Delta Z - r), \phi_j, \theta_j, \psi_j)$. The determined Qj is recorded.

After step S305 or S308, the counters i, j are updated by "+1" in step S309. Then, control goes back to step S301.

In this manner, the tool coordinates Q1, Q2, . . . Qe representative of the small block B1 can be calculated while the counter i is being updated. The calculated small block B1 is recorded by the block data setting recorder 100.

Since the small block B1 is set by deforming and duplicating the small block A, the three-dimensional shape measuring method is highly flexible with respect to workpieces W available in a variety of types.

Figure 12:
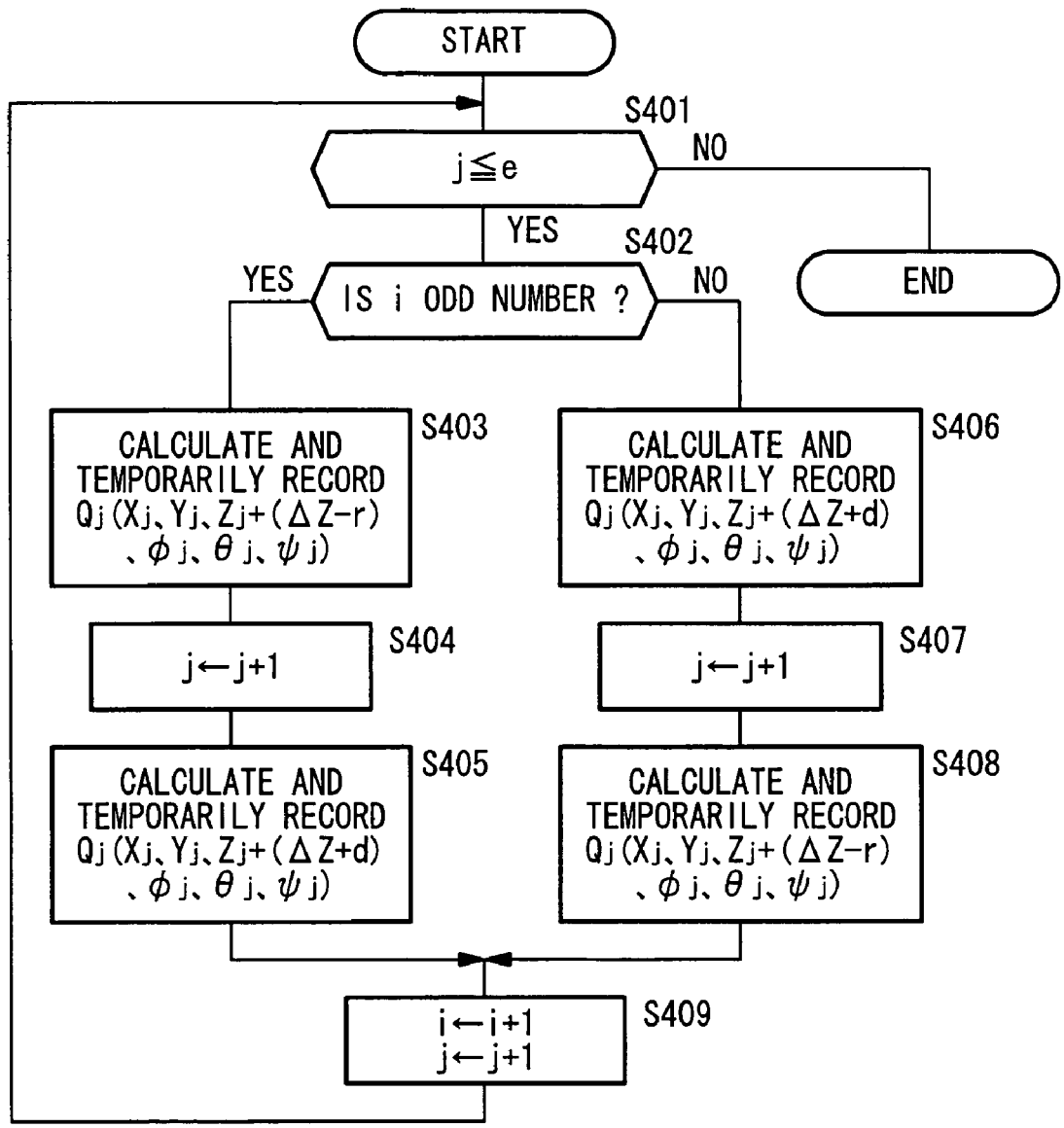
FIG. 12 is a flowchart of the sequence of a process of vertically copying block data based the shape of a workpiece if the workpiece is a sedan.

The processing of step S207, i.e., the processing to be performed if the workpiece W is a sedan, will be described below with reference to FIG. 12.

In step S401, the counter j and the parameter e are compared. As described above, the parameter e is expressed as $e = 2(n-1) + 4$. If j>e, then since all the tool coordinates Q1, Q2, . . . Qe indicative of the small block B2 have been determined, the processing sequence is finished, and control goes to step S3 (see FIG. 6). If j≦e, then control goes to next step S402.

In step S402, it is confirmed whether the counter i represents an odd number or an even number. If the counter i represents an odd number, then control goes to step S403. If the counter i represents an even number, then control goes to step S406.

In step S403 (if i represents an odd number), then Qj representing the starting point of the ith one of (n+1) basic and duplicated paths 122, 124 that make up the small block B2 is calculated. Since Qj is represented as data produced by moving Pj, which represents the starting point of the ith one of (n+1) basic and duplicated paths 122, 124 that make up the small block A, the distance ($\Delta Z - r$) in a +Z direction, it is calculated as $Qj(X_j, Y_j, Z_j + (\Delta Z - r), \phi_j, \theta_j, \psi_j)$. The determined Qj is temporarily recorded. By thus determining Qj, the small block A and the small block B2 overlap each other by the overlapping amount r.

The sedan has a large trunk and a large engine hood where the small block B2 is unnecessary, Qj is temporarily recorded in view of possible rewriting. Qj to be similarly determined in steps S405, S406, and S408 to be described later is also temporarily recorded.

In step S404, the counter j is updated by "+1".

In step S405, Qj representing the ending point of the ith one of (n+1) basic and duplicated paths 122, 124 that make up the small block B2 is calculated. Since Qj is represented as data produced by moving Pj, which represents the ending point of the ith one of (n+1) basic and duplicated paths 122, 124 that make up the small block A, the distance ($\Delta Z + d$) in the +Z direction, it is calculated as $Qj(X_j, Y_j, Z_j + (\Delta Z + d), \phi_j, \theta_j)$. The determined Qj is temporarily recorded.

By thus determining Qj, the small block B2 is deformed so as to extend the extended amount d upwardly, and is set to cover the height h of the workpiece W. Actually, inasmuch as the sedan has a low height, the extended amount d may be set as a negative value to set the small block B2 as a low block.

In step S406 (if i represents an even number), then Qj representing the ending point of the ith one of (n+1) basic and duplicated paths 122, 124 that make up the small block B2 is calculated. Since Qj is represented as data produced by moving Pj, which represents the ending point of the ith one of (n+1) basic and duplicated paths 122, 124 that make up the small block A, the distance (ΔZ+d) in the +Z direction, it is calculated as $Qj(X_j, Y_j, Z_j+(\Delta Z+d), \phi_j, \theta_j, \psi_j)$. The determined Qj is temporarily recorded.

In step S407, the counter j is updated by "+1".

In step S408, Qj representing the starting point of the ith one of (n+1) basic and duplicated paths 122, 124 that make up the small block B2 is calculated. Since Qj is represented as data produced by moving Pj, which represents the starting point of the ith one of (n+1) basic and duplicated paths 122, 124 that make up the small block A, the distance (ΔZ−r) in the +Z direction, it is calculated as $Qj(X_j, Y_j, Z_j+(\Delta Z-r), \phi_j, \theta_j, \psi_j)$. The determined Qj is temporarily recorded.

After step S405 or S408, the counters i, j are updated by "+1" in step S409. Then, control goes back to step S401.

In this manner, the tool coordinates Q1, Q2, . . . Qe representative of the small block B2 can be calculated while the counter i is being updated. The calculated small block B2 is temporarily recorded by the block data setting recorder 100.

Figure 13:
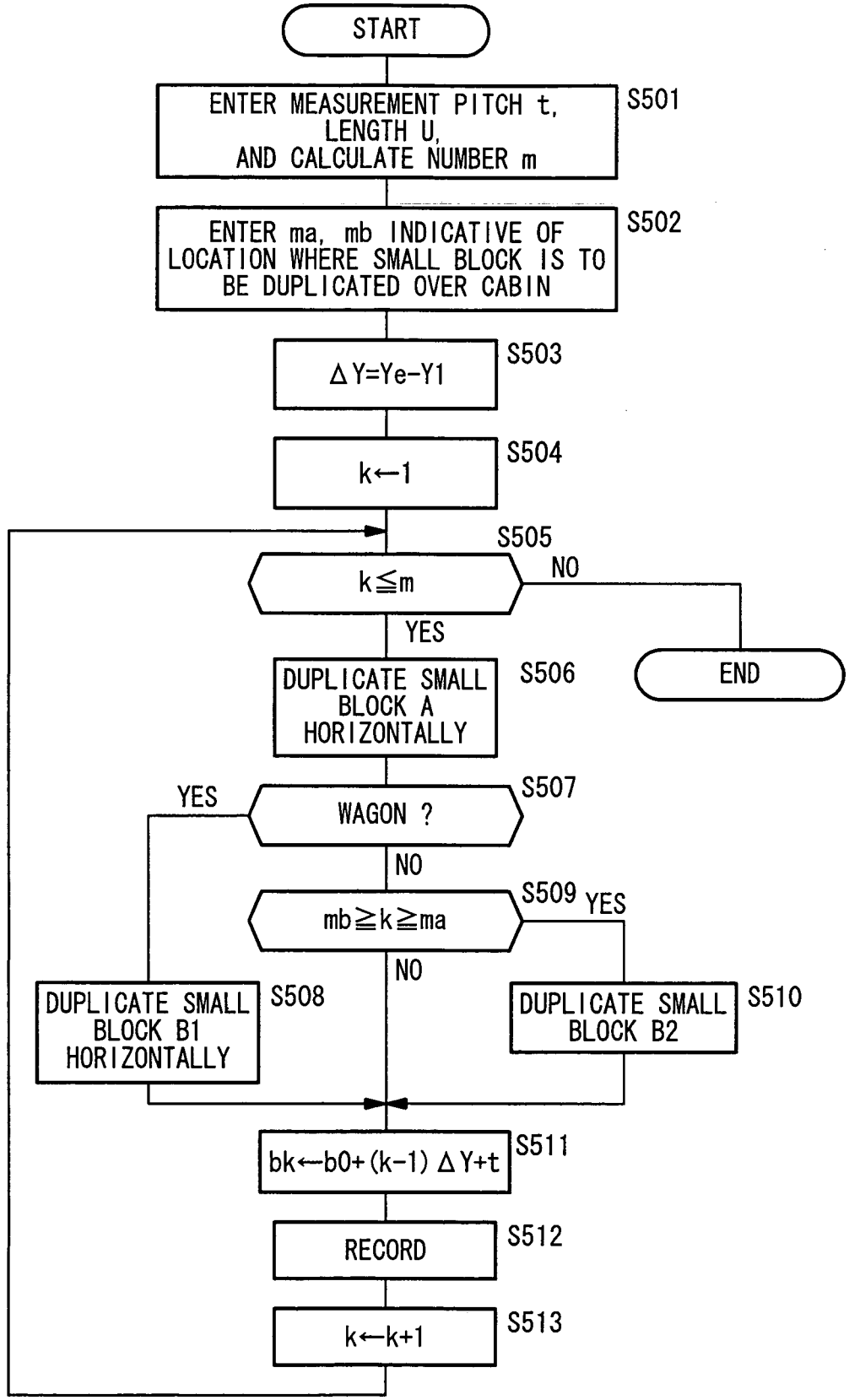
FIG. 13 is a flowchart of the sequence of a process of vertically copying block data based the shape of a workpiece.
Figure 14:
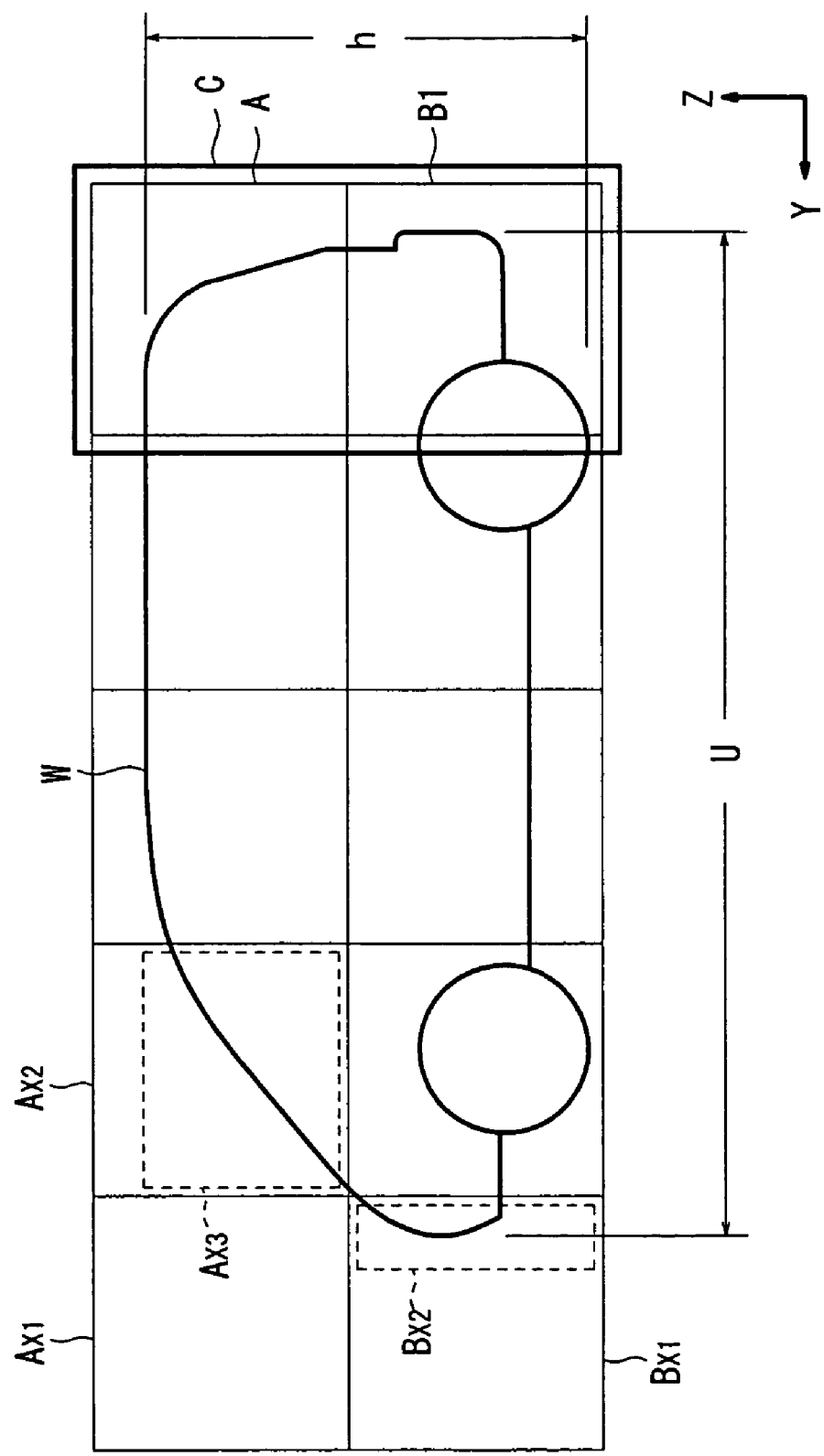
FIG. 14 is a diagram showing the manner in which block data is copied horizontally if the workpiece is a wagon.
Figure 15:
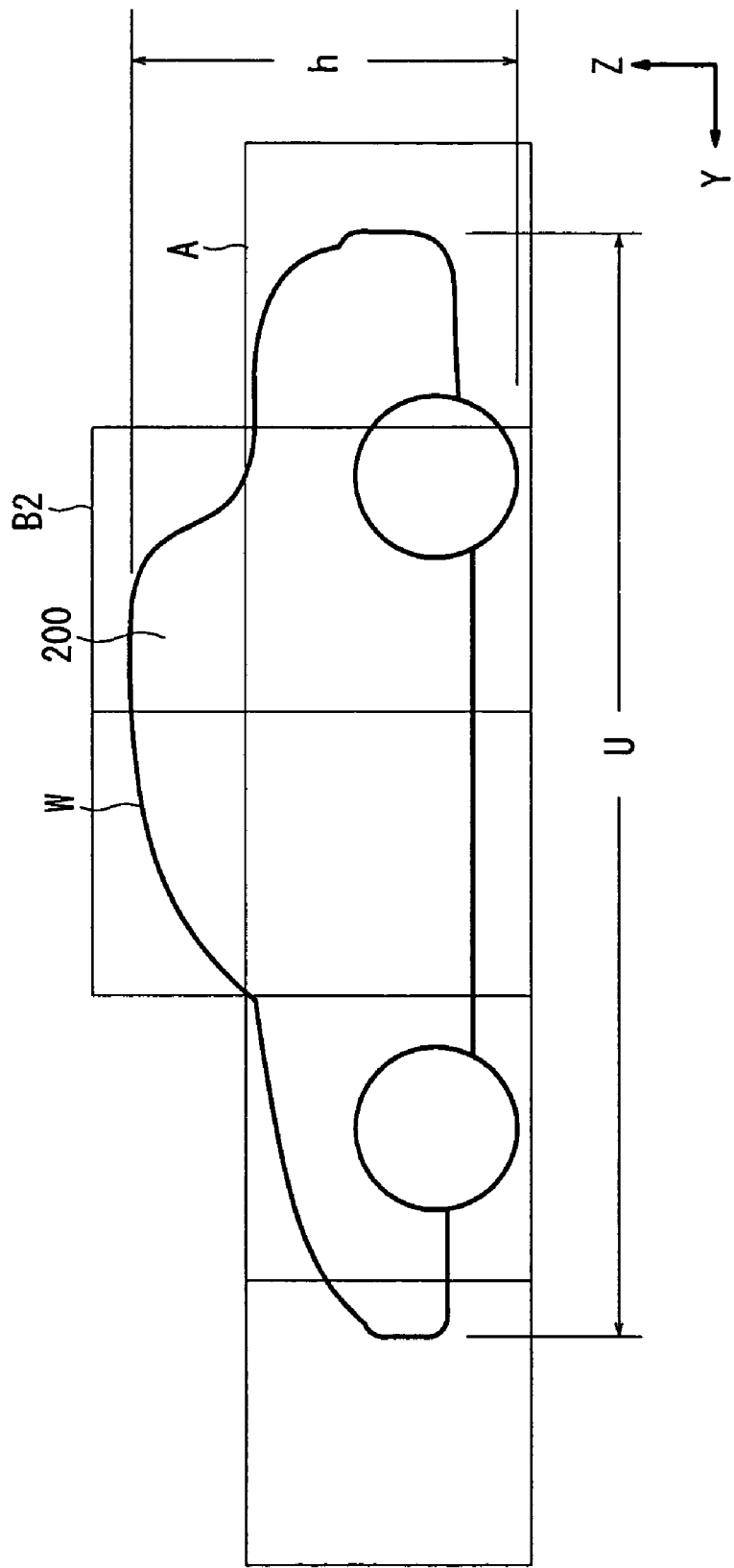
FIG. 15 is a diagram showing the manner in which block data is copied horizontally if the workpiece is a sedan.

The processing of step S3 to be executed after step S2 (see FIG. 6), i.e., the process of duplicating the block data 120 horizontally (in the Y direction), will be described below with reference to FIGS. 13 through 15. According to the processing of step S3, a large block C which includes the small block A and the small block B1 is duplicated m times in the Y direction over a wagon, as shown in FIG. 14, the small block A is duplicated a plurality of times in the Y direction over a sedan, and the temporarily recorded small block B2 is duplicated over a cabin 200, as shown in FIG. 15.

A measurement pitch t between adjacent small blocks A (or large blocks C) is set to prevent a lack of measurement from occurring in the boundary. In order to cover the length U of the workpiece W, m small blocks A or m large blocks C are set. That is, the small block A or the large block C is duplicated (m−1) times.

The measurement pitch t and the length U are entered using the teaching box 66, and the number m is calculated based on the length U.

When the three-dimensional shape of the workpiece W is measured in step S4 (see FIG. 6), it is measured based on a certain small block A or large block C, and thereafter it is measured based on an adjacent small block A or large block C. At this time, since the propelling shaft motor 64 (see FIG. 4) is energized to move the movable carriage 22, when the block data 120 is duplicated horizontally (in the Z direction) in step S3, appropriate positional data bk of the movable carriage 22 is simultaneously calculated (see step S511).

In step S501, the measurement pitch t and the length U are entered using the teaching box 66. The number m is calculated based on the length U and recorded.

In step S502, if the workpiece W is a sedan, then parameters ma, mb indicating a location where the small block B2 is to be duplicated over the cabin 200 are entered. The parameters ma, mb have values corresponding to the number m. The small block B2 is duplicated the number of times that ranges from ma to mb. In the example shown in FIG. 15, ma=2 and mb=3. Step S502 is dispensed with if the workpiece W is a wagon.

In step S503, the distance ΔY in the Y direction between P1 and Pe of the block data 120 is determined. The distance ΔY can be determined as ΔY=Ye−Y1 where Y1, Ye represent the values of Y-direction components among the parameters that make up P1, P2.

In step S504, a counter k is initialized to "1".

In step S505, the counter k and the number m are compared. If k>m, then since the process of duplicating the block data 120 is finished, the processing sequence is finished, and control goes to step S4 (see FIG. 6). If k≦m, then control goes to the next step S506.

In step S506, the small block A is duplicated horizontally (in the Y direction). Specifically, a kth small block A is represented by $Pi_k(i_k=2k \cdot (2 \cdot (n-1)+4)+i)$, and based on Pi (i=1 to e) representing small blocks A generated in step S1, the small block A can be duplicated with only the suffix being changed as follows.

$$Pi_k(X_i, Y_i, Z_i, \phi_i, \theta_i, \psi_i) \leftarrow Pi(X_i, Y_i, Z_i, \phi_i, \theta_i, \psi_i)$$

When three-dimensional measurement is performed based on Pi, $Pi_k$, since the articulated robot 14 is moved in the Y direction, the coordinates as viewed from the articulated robot 14 may exactly be the same values. Therefore, the coordinates "$Y_1$" in the Y direction may be of the same values, and hence the duplicating process is easily performed.

In step S507, the processing is branched based on the vehicle type of the workpiece W. If the workpiece W is a wagon, then control goes to step S508. If the workpiece W is a sedan, then control goes to step S509.

In step S508, the small block B1 is duplicated horizontally (in the Z direction). This processing is similar to the processing of step S506. Specifically, if a kth small block B1 is represented by $Qi_k$, then the small block B1 is duplicated by the process, $Qi_k(X_i, Y_i, Z_i, \phi_i, \theta_i, \psi_i) \leftarrow Qi(X_i, Y_i, Z_i, \phi_i, \theta_i, \psi_i)$. Thereafter, control goes to step S511. The large block C has been duplicated by the duplicating process in step S508 and step S506.

In step S509, the value of the counter k at the time is confirmed. If mb≧k≧ma, then control goes to step S509. If k>mb or k<ma, control goes to step S511. That is, step S510 is executed only when the cabin 200 is processed.

In step S510, the temporarily recorded small block B2 is duplicated. This processing is similar to the processing of step S506. Specifically, if a kth small block B2 is represented by $Qi_k$, then the small block B2 is duplicated by the process, $Qi_k(X_i, Y_i, Z_i, \phi_i, \theta_i, \psi_i) \leftarrow Qi(X_i, Y_i, Z_i, \phi_i, \theta_i, \psi_i)$. Thereafter, control goes to step S511.

In step S511, the positional data bk of the movable carriage 22 is calculated. The positional data bk is determined as bk←b0+(k−1)·ΔY+t where b0 represents data indicative of the initial position of the movable carriage 22 which corresponds to the first block A.

In step S512, the blocks A, B1, B2 determined in steps S506, S508, S510 are recorded in association with the positional data bk determined in step S511.

In step S513, the counter k is updated by "+1". Then, control goes back to step S505.

By thus incrementing the counter k, the small blocks A, B1, B2 are duplicated and the corresponding positional data bk are determined and recorded. Therefore, the small blocks A, B1, B2 which are hypothetical blocks are duplicated based on the basic shape type of the selected workpiece W to cover an area to be measured of the surface of the workpiece W that is projected onto a hypothetical space.

The duplicated small blocks A, B1, B2 are set so as to cover the area to be measured of the projected surface of the workpiece W. For example, if a front windshield of the workpiece W is to be measured by the articulated robot 14 that has been moved to a position in front of the workpiece W, then the front windshield may not be covered with the small blocks A, B1, B2 as viewed from the side.

If the workpiece W is a wagon, then the large block C which includes the small block A and the small block B1 is duplicated. As shown in FIG. 14, since a small block $Ax_1$ of the small block A positioned above a front hood may not be necessary, the operator may delete the small block $Ax_1$ by operating the teaching box 66. A small block $Ax_2$ of the small block A positioned over the front windshield may be of a slightly low height. Therefore, the operator may operate the teaching box 66 to replace the data of the small block $Ax_2$ with a small block $Ax_3$ of rewritten data which has a slightly low height. Furthermore, a small block $B1x_1$ of the small block B positioned over a front fender may be of a slightly reduced width. Therefore, the operator may operate the teaching box 66 to replace the small block $B1x_1$ with a small block $B1x_2$ containing duplicated paths 124 (see FIG. 8) that are fewer than the duplicated paths 124 of the small block $B1x_1$.

Because teaching data for the articulated robot 14 has been generated by the processing (steps S1 to S3) up to this time, control may then go to step S4 to operate the articulated robot 14 and the propelling shaft motor 64 for measuring the three-dimensional shape of the workpiece W.

Specifically, the laser scanner 12 is placed in the position represented by P1 through Pe, and the distance between the laser scanner 12 and the surface of the workpiece W is measured by the laser displacement gage 20. If the distance does not fall in the range of L±ϵ, then the laser scanner 12 is moved toward or away from the workpiece W to bring the distance into the range of L±ϵ. Thereafter, based on the positions and the attitudes of the distal end 36 and the laser scanner 12, the laser scanner 12 is moved in substantially the same direction as the basic path 122 or the duplicated paths 124, and the distance is measured. At this time, in view of the data of the laser displacement gage 20, a suitable correction is made to determine the moving direction so that the distance from the laser scanner 12 to the surface of the workpiece W does not fall out of the range of L±ϵ. For example, if the distance between the laser scanner 12 and the workpiece W is of a value close to L±ϵ, then a correction is made to move the distal end 36 and the laser scanner 12 in a direction toward the workpiece W. If the distance between the laser scanner 12 and the workpiece W is of a value close to L−ϵ, then a correction is made to move the distal end 36 and the laser scanner 12 in a direction away from the workpiece W.

The moving direction may be determined based on the positions and the attitudes of the distal end 36 and the laser scanner 12 at the time, and the distal end 36 and the laser scanner 12 do not need to be returned to a position represented by the basic path 122 or the duplicated paths 124. The measurement can thus be made continuously while keeping the laser scanner 12 spaced from the surface of the workpiece W by a distance in the range of L±ϵ.

If the value of ϵ is sufficiently large, then the laser scanner 12 may not be moved toward or away from the workpiece W, but may be moved along a passage represented by the basic path 122 or the duplicated path 124.

As described above, with the three-dimensional shape measuring apparatus 10 according to the present embodiment and the three-dimensional shape measuring method using the three-dimensional shape measuring apparatus 10, after the block data 120 is set, the block data 120 is copied over a given area of the workpiece W which is required for measurement, based on the basic shape type of the workpiece W and the entered dimensions of the workpiece W. Therefore, the substantial teaching process is only a process of generating initial block data 120, allowing the articulated robot 14 to be trained for operation simply in a short period of time.

If the size of the workpiece W is essentially the same as the size of a clay model, then regardless of whether the workpiece W is a wagon or a sedan, the block data 120 as the small block A can be shared, and hence the process of generating the block data 120 can be dispensed with.

If the workpiece W is of a large shape such as an actual vehicle shape, for example, then other block data dedicated for an actual vehicle, separate from the block data 120 for the clay model, may be generated and recorded by a given recorder.

The block data 120 can simply be generated because only one basic path 122 may be generated and other duplicated paths 124 may be produced by duplicating the basic path 122.

Figure 16:
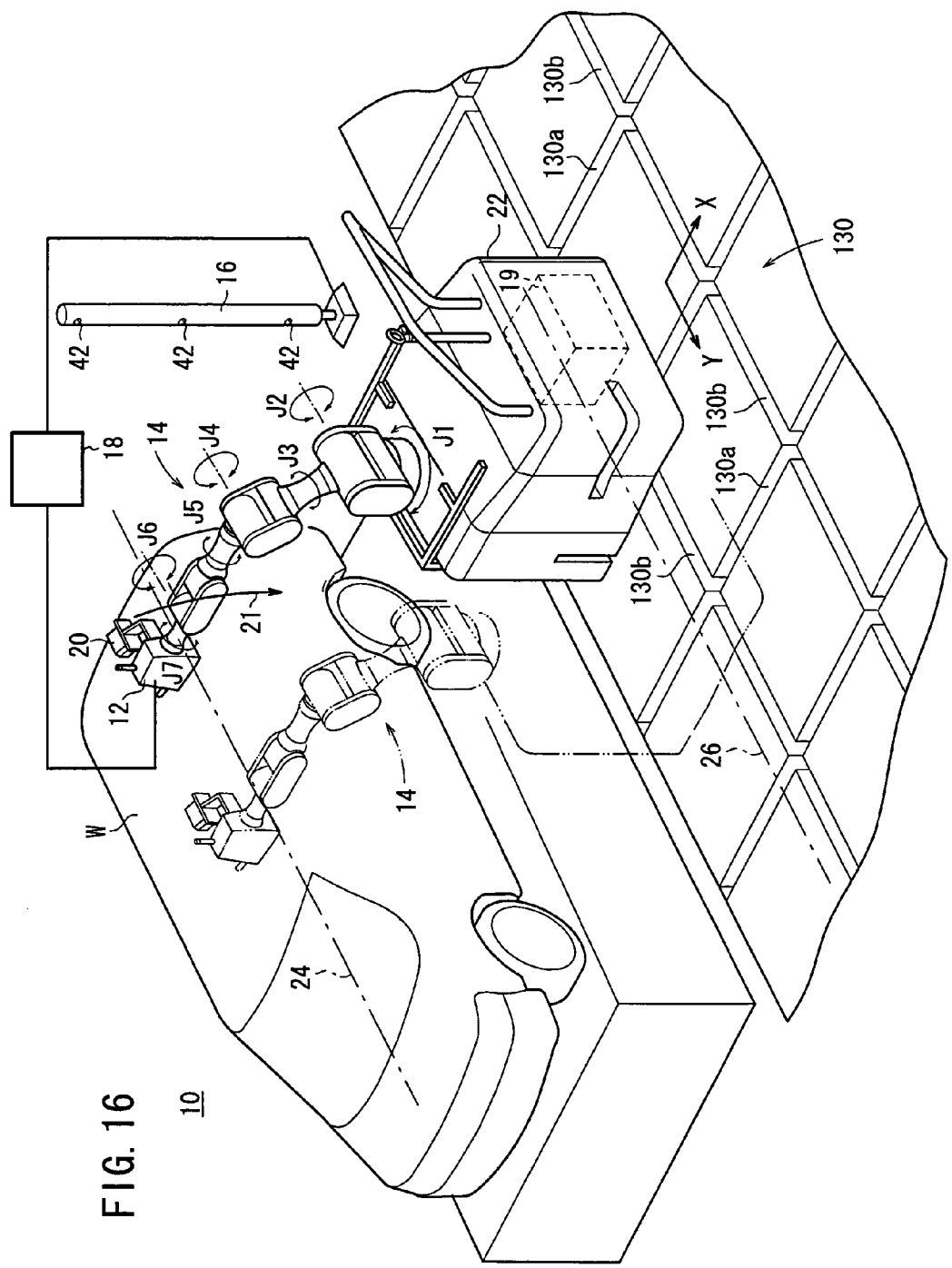
FIG. 16 is a schematic perspective view of an example in which the three-dimensional shape measuring apparatus is disposed on a bed having a grid-like pattern of moving paths.

In the above description, the movable carriage 22 with the articulated robot 14 placed thereon is moved along the rail 26 (see FIG. 1) in the Y direction. However, as shown in FIG. 16, for example, the movable carriage 22 may be disposed on a bed 130 having a grid-like pattern of moving paths. The bed 130 has a plurality of grooves (moving paths) 130a in the X direction and a plurality of grooves (moving paths) 130b in the Y direction, the grooves being spaced at given intervals. The three-dimensional shape measuring apparatus 10 is movable along these grooves 130a, 130b in the X direction and the Y direction to make itself highly flexible with respect to workpieces available in a variety of types.

The invention claimed is:

1. A method of measuring a three-dimensional surface shape of a workpiece (W) by moving a three-dimensional measuring unit mounted on a robot to trace a surface of said workpiece (W), comprising the steps of:
    setting and recording block data representing a measuring operation to cause said three-dimensional measuring unit to trace a predetermined area;
    setting a length (U) and/or a height (h) of said workpiece (W);
    selecting one of a plurality of basic shape types which is similar to a shape of said workpiece (W);
    duplicating said block data such that a hypothetical block representing said block data covers an area to be measured of the surface of said workpiece (W) which is projected onto a hypothetical space, depending on the selected basic shape type and the length (U) and/or the height (h) of said workpiece (W);
    measuring the surface shape of said workpiece (W) based on the duplicated block data; and
    recording positional data representing the measured surface shape of said workpiece.

2. A method according to claim 1, wherein said three-dimensional measuring unit includes a displacement gage for measuring a distance up to said workpiece (W), and said robot is operated based on the distance measured by said displacement gage to move said three-dimensional measuring unit toward or away from said workpiece (W) to keep said three-dimensional measuring unit in a measurable range from said workpiece (W) while the measuring operation is performed.

3. A method according to claim 1, wherein said block data comprises data representing a motion pattern for reciprocally moving said three-dimensional measuring unit while displacing said three-dimensional measuring unit horizontally by a detection width (D).

4. A method according to claim 1, wherein in said duplicating step, said block data is deformed and duplicated.

5. A method according to claim 1, wherein in said measuring step, after said surface shape is measured based on predetermined block data and when said surface shape is measured based on next block data, a base of said robot is moved in positional alignment with the next block data.

6. A method according to claim 5, wherein said base is placed on a movable carriage, and said base is moved when said movable carriage is moved.

7. A method of measuring a three-dimensional surface shape of a workpiece (W) by moving a three-dimensional measuring unit mounted on a robot to trace a surface shape of the workpiece (W), comprising the steps of:
    setting a basic path for moving said three-dimensional measuring unit a predetermined distance;
    duplicating said basic path a plurality of times at predetermined intervals to set block data (120) representing a measuring operation to cause said three-dimensional measuring unit (12) to trace the surface shape of said workpiece (W); and
    recording positional data representing the traced surface shape of said workpiece.

8. An apparatus for measuring a three-dimensional surface shape of a workpiece (W) by moving a three-dimensional measuring unit mounted on a robot to trace a surface of said workpiece (W), comprising:
    a block data setting recorder for setting and recording block data representing a measuring operation to cause said three-dimensional measuring unit to trace a predetermined area;
    a data input unit for setting a length (U) and/or a height (h) of said workpiece (W);
    a basic shape selector for selecting one of a plurality of basic shape types which is similar to a shape of said workpiece (W);
    a block data duplicator for duplicating said block data such that a hypothetical block representing said block data covers an area to be measured of the surface of said workpiece (W) which is projected onto a hypothetical space, depending on the selected basic shape type and the length (U) and/or the height (h) of said workpiece(W); and
    a measurement performing unit for measuring the surface shape of said workpiece (W) based on the duplicated block data.

9. An apparatus according to claim 8, wherein said three-dimensional measuring unit includes a displacement gage for measuring a distance up to said workpiece (W), and said robot is operated based on the distance measured by said displacement gage to move said three-dimensional measuring unit toward or away from said workpiece (W) to keep said three-dimensional measuring unit in a measurable range from said workpiece (W) while the measuring operation is performed.

10. An apparatus according to claim 8, wherein said block data comprises data representing a motion pattern for reciprocally moving said three-dimensional measuring unit while displacing said three-dimensional measuring unit horizontally by a detection width (D).

11. An apparatus according to claim 8, wherein said block data duplicator duplicates said block data while deforming said block data.

12. An apparatus according to claim 8, wherein after said measurement performing unit measures said surface shape based on predetermined block data and when said measurement performing unit measures said surface shape based on next block data, a base of said robot is moved in positional alignment with the next block data.

13. An apparatus according to claim 12, wherein said base is placed on a movable carriage, and said base is moved when said movable carriage is moved.

* * * * *